UNITED STATES PATENT OFFICE.

TREVOR M. CAVEN, OF CHICAGO, ILLINOIS, ASSIGNOR TO KIESELGUHR COMPANY OF AMERICA, OF LOS ANGELES, CALIFORNIA, A CORPORATION OF CALIFORNIA.

PROCESS OF MAKING MOLDED ARTICLES.

1,139,637. Specification of Letters Patent. Patented May 18, 1915.

No Drawing. Application filed April 1, 1914. Serial No. 828,875.

*To all whom it may concern:*

Be it known that I, TREVOR M. CAVEN, a citizen of the United States, residing at Chicago, in the county of Cook and State of Illinois, have invented a new and useful Process of Making Molded Articles, of which the following is a specification.

This invention relates to the manufacture of molded articles in which kieselguhr or diatomaceous earth is the essential or main constituent, and the main object of the invention is to enable the material consisting of kieselguhr, with or without admixture of other substances, to be brought to a condition of proper fluidity or plasticity to enable it to be molded or cast.

I have found that when kieselguhr is mixed with sufficient water to produce a stiff or slightly plastic mass, and this mass is then agitated or broken up in a suitable mixer, the mixture loses its stiffness and becomes relatively fluid. The increase in fluidity or "breaking down" of the kieselguhr, resulting from the amount of mixing or stirring which is necessary to produce a satisfactory mixture, is so great that the mass is either too stiff to work at first, or too fluid and slippery for molding when the mixture is completed. I avoid this difficulty by adding solid material to the mass in stages during the mixing operation, such solid material being either additional kieselguhr or suitable filler, or other solid material.

My invention is especially adapted for the production of a material for light porous molded articles, by admixture of organic material with the kieselguhr, this organic material being subsequently burned out; as the addition of the organic material in stages enables me to increase the amount of organic material used and to correspondingly increase the porosity of the product.

The process is carried out as follows: The kieselguhr which may be the air-dried kieselguhr of commerce, is crushed to a suitable state of division, for example, to a condition approximating that of coarse sand, and is then mixed with organic material, preferably cellulose or wood or vegetable fiber, such as sawdust, in suitable proportion, either before or after the breaking down operation.

A proportion suitable for producing a brick of minimum weight is as follows: kieselguhr, 50%, sawdust 50%. There is some difficulty in introducing such a large proportion of sawdust into effective mixture with the kieselguhr. In order to effect the mixture I prefer to proceed as follows: kieselguhr is mixed with a portion of the sawdust, say 20% and sufficient water to form a moist plastic mass capable of retaining its form but not enough water to cause it to become fluid, and the material is then mixed in a suitable mixing apparatus the mixing operation being carried on until the mixture is broken down, that is to say, becomes relatively fluid. A further quantity of sawdust is then added and the mixing operation continued, until the mixture again breaks down and this being repeated, until the desired quantity of sawdust has been incorporated into the mixture. If it is attempted to incorporate the entire quantity of sawdust with the kieselguhr and water at one mixture, it is found that in order to make the mixture workable in the mixing apparatus, so much water must be added that eventually when the mixing operation has been carried to a further point, the increase of fluidity due to the breaking down of the mixture produces a sloppy mass unfitted for molding. To produce a composition adapted for molding, it is desirable that the mixture should contain no more water than is necessary to produce plasticity of the composition and this effect is secured by adding the sawdust in stages so as to eliminate the effect of the mixing operation in breaking down, or rendering fluid the mixture. The mixture formed as above described is molded into the desired or required form for blocks, bricks or other articles, and the said articles are dried in any suitable manner, for example, air-dried, and are then introduced into any suitable kiln or furnace and subjected to sufficient heat to incinerate and decompose the sawdust. This heating operation is preferably carried sufficiently far to practically burn the sawdust, leaving only the ash or mineral content thereof which forms a binder for the kieselguhr. The burning operation above referred to may be carried on in any suitable apparatus such as a kiln or furnace and at a temperature similar to that used in burning ordinary brick. The distribution of a binding material throughout the mass of kieselguhr is one of the functions and advantages of the sawdust or organic material, the main object and advantage of this material being, however, that when it is burned away it leaves open spaces or porosities in the article, correspondingly reducing the density or weight of the article. In some cases the heating of the article may be carried on under such conditions and for such length of time as to only partially drive off the organic matter, leaving, for example, a portion of the carbon content thereof as a binder for the article. Instead of the proportions above specified, any other suitable proportions may be used according to the porosity desired in the finished article, this porosity decreasing as the proportion of sawdust is decreased.

By the above described process I produce a molded article composed of kieselguhr with a binder of vegetable ash supplementing the binding effect due to the action of the heat on the kieselguhr itself. A brick may be made in this manner whose weight is only a small fraction of an ordinary clay and sand brick of the same size. For example, by using equal parts, as stated, of kieselguhr and sawdust a composition is obtained whose density as a whole is about twenty-five per cent of that of ordinary brick.

In case a more compact material is required, I may use kieselguhr alone, it being first mixed with sufficient water to form a stiff mass capable of being broken up by the mixed and when it has become broken down so as to be relatively fluid, more finely divided kieselguhr is added to make it relatively stiff, and the breaking down action is repeated, the operation being repeated until the thoroughly mixed product has the proper consistency for molding. Any solid material, such as a suitable filler, for example sand, may be incorporated with the kieselguhr in this manner. Moreover any suitable binder, such as lime, cement, or alkalis, capable of reacting with the kieselguhr may be added to the kieselguhr before or during the mixing operation. When the material is thoroughly mixed it is molded to shape and then treated by steam, fire heat or otherwise to render the mass coherent.

What I claim is:

1. The process of making a material for molded articles which consists in mixing diatomaceous material with sufficient water to form a slightly plastic mass, then subjecting the mixture to mechanical agitation until it is broken down and assumes a state of increased fluidity, then adding more solid material to reduce the fluidity, reagitating to again increase the fluidity and repeating the addition of solid material and agitation until the requisite uniform mixture together with proper fluidity for molding is attained.

2. The process of making molded articles which consists in mixing divided kieselguhr with divided vegetable fibrous material and sufficient water to form a plastic mass, subjecting the mixture to mechanical agitation until the mixture is broken down and assumes a state of increased fluidity, then adding a further quantity of divided vegetable fibrous material and repeating the agitating action, continuing this successive addition of vegetable fibrous material until the required proportion of such material is obtained, in suitable condition for molding then molding the resulting composition, drying the same, and then subjecting the molded composition to the action of sufficient heat to decompose the vegetable fibrous material.

In testimony whereof, I have hereunto set my hand at Chicago, Illinois, this 17 day of March, 1914.

TREVOR M. CAVEN.

In presence of—
Jos. Finn,
W. Harding.

Correction in Letters Patent No. 1,139,637.

It is hereby certified that in Letters Patent No. 1,139,637, granted May 18, 1915, upon the application of Trevor M. Caven, of Chicago, Illinois, for an improvement in "Processes of Making Molded Articles," an error appears in the printed specification requiring correction as follows: Page 2, line 33, for the word "mixed" read *mixer;* and that the said Letters Patent should be read with this correction therein that the same may conform to the record of the case in the Patent Office.

Signed and sealed this 28th day of September, A. D., 1915.

[SEAL.]

J. T. NEWTON,

*Acting Commissioner of Patents.*